July 21, 1936. F. FRELIN 2,048,002

COOLING DEVICE FOR PISTONS

Filed Aug. 29, 1934

INVENTOR.
Fritjof Frelin.
BY C. A. Adee
HIS ATTORNEY.

Patented July 21, 1936

2,048,002

UNITED STATES PATENT OFFICE 2,048,002

COOLING DEVICE FOR PISTONS

Fritjof Frelin, Phillipsburg, N. J., assignor to Ingersoll-Rand Company, Jersey City, N. J., a corporation of New Jersey Application August 29, 1934, Serial No. 741,912

2 Claims. (Cl. 123—176)

This invention relates to cooling devices, and more particularly to cooling devices for pistons of internal combustion engines and similar machines in which the piston head is exposed to extremely high temperatures.

The invention is particularly applicable to pistons of large diameter of which the central areas of the piston head are located too far from the cylinder wall to permit of the heat in such portions to be removed at a sufficiently rapid rate to prevent distortion, fracture or burning of the head.

It is an object of the present invention to maintain the temperature of the piston head within safe limits.

Another object of the invention is to utilize a portion of the oil employed for lubricating the various bearings of the engine as a medium for effecting the removal of heat from the piston head.

Other objects will be in part obvious and in part pointed out hereinafter.

Figure 1:
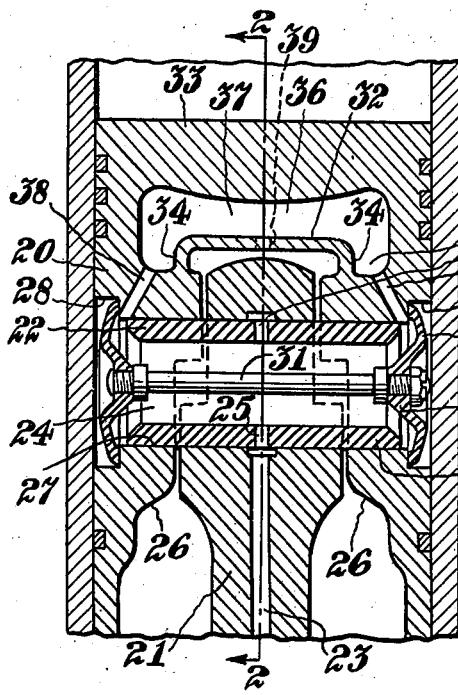
Figure 2:
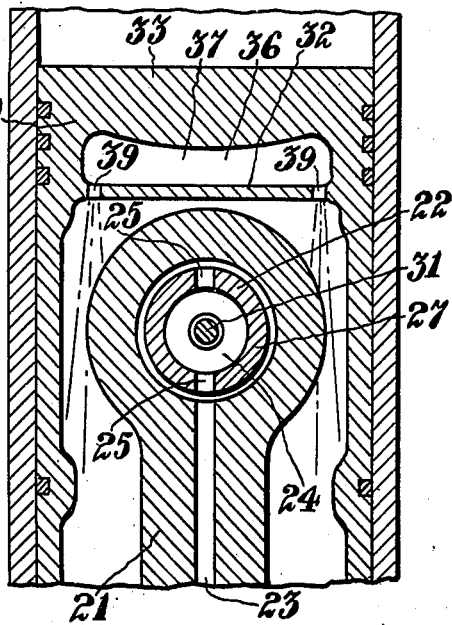

In the drawing accompanying this specification and in which similar reference numerals refer to similar parts, Figure 1 is a sectional elevation of a piston having the invention applied thereto, and Figure 2 is a transverse view taken through Figure 1 on the line 2—2.

Referring to the drawing, 20 designates a piston and 21 a connecting rod which is connected to the piston by a wrist pin 22.

The connecting rod 21 is provided with the usual passage 23 for conveying oil, under pressure, to the surface of the wrist pin for lubricating its bearings and, in the present instance, the wrist pin 22 is provided with a bore which extends entirely therethrough to form a chamber 24 for oil which is admitted into the chamber 24 by passages 25, in the wrist pin, communicating with the passage 23.

On the inner surface of the piston are the usual diametrically opposed bosses 26 having bores 27 into which the ends of the wrist pin extend. At the outer ends of the bores 27 are enlarged recesses 28 containing plates 29 which seat against the bottoms of the recesses 28 and cooperate therewith to seal the outer ends of the bores 27.

The plates 29 are preferably constructed of flexible material. They are of dish-shape having hub portions 30 into which are threaded the ends of a rod 31 whereby the plates are held securely in position.

Preferably, the wrist pin 22 is somewhat shorter than the distance between the outer ends of the bores 27 so that oil may pass freely from the ends of the chamber 24 into all portions of the spaces within the plates 29.

In accordance with the practice of the invention, the piston is provided with an internal wall 32 between the bosses 26 and the head 33 of the piston. The wall 32 is preferably arranged in substantial parallelism with the outer surface of the head 33. It spans the space between the bosses 26 and has depending portions 34 at its sides which join the wall to the bosses and combine therewith and with the wall of the piston to define depressed portions 35 of a chamber 36 of which the portion 37 lying between the wall 32 and the head 33 of the piston constitutes a shallow portion.

Communication is afforded between the oil chamber 24 in the wrist pin and the chamber 36 by passages 38 which open with one end into the bottom of the depressed portions 35 of the chamber 36 and with their other ends into the outer ends of the bores 27. Ports 39 in the wall 32 afford an outlet for the oil from the chamber 36.

In practice, when the engine of which the piston 20 is a part is in operation, oil flows from the ends of the chamber 24 through the passages 38 into the chamber 36, thence through the ports 39 to return to the crank pan or oil reservoir. By suitably proportioning the various ports and passages which supply oil to the chamber 36 and convey it therefrom the said chamber may be constantly maintained filled with a moving body of oil which carries away the heat transmitted thereto by the head 33. In consequence, the head will be protected against the effects of extreme temperatures incident to combustion without, however, lowering the temperature of the head to a value sufficiently low to impair the performance of the engine.

After a period of operation, that is when the engine stands idle and the delivery of oil to the chambers 24 and 36 ceases, the oil lying in the shallow portion 37 of the chamber 36 above the wall 32 will drain through the ports 39. Only the depressions 35 will then remain filled with oil which, at the beginning of a subsequent period of operation of the engine, will immediately be cast against the piston head and prevent overheating thereof until the chamber 36 is again filled and the oil circulates through the chamber as a constant stream.

I claim:

1. In a cooling device, the combination of a piston and a connecting rod, a wrist pin connecting the two and having a bore therethrough to form an oil chamber, and a cooling chamber in the piston comprising a shallow portion and a plurality of deep portions, said piston having passages leading from the oil chamber to the deep portions of the cooling chamber to convey oil to the cooling chamber and having an outlet passage intermediate the deep portions to convey oil from the cooling chamber.

2. In a cooling device, the combination of a piston and a connecting rod, a wrist pin connecting the two and having a bore therethrough to form an oil chamber, a wall in the piston forming a cooling chamber adjacent the piston head and having depending portions to define depressions in the opposite sides of the cooling chamber, said piston having passages leading from the oil chamber to the lowermost portions of the depressions and said wall having ports to convey oil from the cooling chamber.

FRITJOF FRELIN.